United States Patent
Mitsumoto

(10) Patent No.: US 10,927,913 B2
(45) Date of Patent: Feb. 23, 2021

(54) FRICTIONAL MATERIAL COMPOSITION, FRICTIONAL MATERIAL, AND FRICTION MEMBER

(71) Applicant: SHOWA DENKO MATERIALS CO., LTD., Tokyo (JP)

(72) Inventor: Masamichi Mitsumoto, Tokyo (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 0 days.

(21) Appl. No.: 16/111,093

(22) Filed: Aug. 23, 2018

(65) Prior Publication Data

US 2019/0203790 A1 Jul. 4, 2019

Related U.S. Application Data

(60) Provisional application No. 62/611,007, filed on Dec. 28, 2017.

(51) Int. Cl.
*F16D 69/02* (2006.01)
*F16D 69/00* (2006.01)

(52) U.S. Cl.
CPC ......... *F16D 69/028* (2013.01); *F16D 69/026* (2013.01); *F16D 2069/001* (2013.01); *F16D 2200/003* (2013.01); *F16D 2200/0008* (2013.01); *F16D 2200/0043* (2013.01); *F16D 2200/0065* (2013.01); *F16D 2200/0086* (2013.01)

(58) Field of Classification Search
CPC ............... F16D 69/028; F16D 69/026; F16D 2200/003; F16D 2200/0086; F16D 2200/0065; F16D 2069/001; F16D 2200/0008; F16D 2200/0043
See application file for complete search history.

(56) References Cited

U.S. PATENT DOCUMENTS

| | | | |
|---|---|---|---|
| 2002/0006981 A1 | 1/2002 | Nakamura et al. | |
| 2004/0253173 A1* | 12/2004 | Ogawa | C01G 23/005 423/598 |
| 2014/0202805 A1* | 7/2014 | Unno | F16D 69/026 188/251 A |
| 2016/0069408 A1* | 3/2016 | Hattori | F16D 69/026 523/156 |

FOREIGN PATENT DOCUMENTS

| | | |
|---|---|---|
| JP | 2002-138273 A | 5/2002 |
| JP | 2015-004037 A | 1/2015 |

* cited by examiner

*Primary Examiner* — Alexander C Kollias
(74) *Attorney, Agent, or Firm* — Wenderoth, Lind & Ponack, L.L.P.

(57) ABSTRACT

The present invention is concerned with a frictional material composition not containing copper as an element or having the content of copper of 0.5 mass % or less, the composition containing a cashew dust;
(A) potassium titanate;
(B) one or more selected from the group consisting of lithium potassium titanate and magnesium potassium titanate; and
(C) one or more selected from the group consisting of zirconium silicate, zirconium oxide, and magnesium oxide, wherein the content of the cashew dust is 1 to 10 mass %, and the content of the component (C) is 11 to 30 mass %.

9 Claims, No Drawings

FRICTIONAL MATERIAL COMPOSITION, FRICTIONAL MATERIAL, AND FRICTION MEMBER

FIELD OF THE INVENTION

The present invention relates to a frictional material composition, a frictional material, and a friction member.

BACKGROUND OF THE INVENTION

Frictional materials, such as a disc brake pad and a brake lining, are used for braking an automobile and the like. Such a frictional material plays a role in the braking by rubbing an opposite material, such as a disc rotor and a brake drum. Therefore, the frictional material is not only required to have an appropriate friction coefficient (efficacy characteristics) according to the use condition but also required to have such characteristics that squeal is hardly generated (squeal characteristics) and that the life of the frictional material is long (abrasion resistance).

The frictional material is roughly classified into a semi-metallic material containing, as a fiber base material, 30 to 60 mass % of a steel fiber, a low steel material containing less than 30 mass % of a steel fiber, and an NAO (Non Asbestos Organic) material not containing a steel fiber. However, a frictional material containing a minute amount of a steel fiber is also occasionally classified into the NAO material.

Since the NAO material does not substantially contain a steel fiber, it has such a characteristic feature that it is low in aggression to a disc rotor that is an opposite material, as compared with the semi-metallic material and the low steel material. From such an advantage, the NAO material which is excellent in a balance among the efficacy, the squeal, and the abrasion resistance is currently the mainstream in Japan, the United States of America, and the like. Meanwhile, in Europe, from the viewpoint of keeping the friction coefficient during high-speed braking, the low steel material was frequently used. But, in recent years, in order to respond to the high-end market, even in Europe, the use of the NAO material that hardly generates wheel dirt of a tire and brake squeal is increasing.

The NAO material is generally one containing a copper powder or fiber. But, since the frictional material containing copper contains copper in an abrasion powder produced during the braking, there is suggested a possibility that the abrasion powder leads to pollution of rivers, lakes, and so on. For that reason, the state of California and the state of Washington of the United States of America have passed a bill to prohibit the sales of a frictional material containing 5 mass % or more of copper and an act of assembling the foregoing frictional material into a new car from the year of 2021 and the sales of a frictional material containing 0.5 mass % or more of copper and an act of assembling the foregoing frictional material into a new car from the year of 2023.

For that reason, the development of NAO materials not containing copper or having a less content of copper is a pressing need, and investigations thereof are made (see, for example, JP 2002-138273 A (Patent Literature 1) and JP 2015-004037 A (Patent Literature 2)).

Then, the NAO material forms a transfer film (hereinafter also referred to as "TF") in which the frictional material has been transferred onto the disc rotor surface, and this TF not only contributes to stabilization of the friction coefficient but also contributes to suppression of abrasion. For this reason, in revealing the function of the NAO material, it is extremely important that an appropriate amount of the TF is formed.

Examples of components which form the TF include a variety of organic materials in the frictional material and titanates. An organic material, such as a phenol resin, a rubber component, and a cashew dust, becomes a liquid decomposition product due to heat generated during braking, thereby forming the TF on the disc rotor surface. In addition, the titanate, such as potassium titanate, spreads onto the friction interface due to braking, thereby becoming a component of the TF.

In addition, copper is also an important component in the frictional material constituting the TF. Copper is used in a powder or fiber state for the frictional material, is high in ductility and malleability, and spreads onto the frictional material surface and the disc rotor surface due to braking, thereby forming the TF. In addition, copper also has such an effect that by smashing or burying a polishing groove during manufacture remaining on the brake rotor surface when it is new, the aforementioned organic decomposition product and titanate form a surface which is readily fixed as the TF. However, the frictional material not containing copper or having a less content of copper does not have such an action and hardly forms the TF.

Furthermore, in recent years, the diffusion of a regenerative coordination brake is being advanced in the automobile market. The regenerative coordination brake utilizes, as a braking force, not only the conventional frictional resistance by a frictional material but also resistance on converting a rotational force of a tire into an electric power. In this case, in braking in a high-speed running state, in view of the fact that the rotational force of a tire is high, and that the power generation efficiency becomes large, the regenerative coordination brake is frequently used, whereas the braking by a frictional material is restricted to a low-speed running state in which the power generation efficient of the regenerative coordination brake is low. That is, a rate of braking by the frictional material is remarkably reduced.

As a result, the amount of heat generated on the friction interface during braking by the frictional material becomes small, so that the TF component, such as an organic decomposition product and a titanate, is hardly transferred onto the disc rotor surface. In addition, since copper cannot be used from the aforementioned reasons, it becomes much more difficult to reveal stable frictional characteristics through formation of the TF.

In particular, in the regenerative coordination brake, the braking is electronically controlled, and therefore, when the frictional coefficient of the frictional material is not stable, a braking force not less than one estimated by a driver is generated to produce a sudden braking, or reversely, a braking force desired by a driver is not obtained, so that a braking distance is extended. As a result, comfortable driving is impaired.

From this point of view, a problem of the technologies disclosed in Patent Literatures 1 and 2 is to complement frictional characteristics during high-load braking at the time of high-speed running by paying attention to high thermal conductivity and high-temperature lubricating properties of copper, but they do not take into consideration light-load braking from low-speed running.

Patent Literature 1 is aimed to complement the thermal conductivity and proposes a method of blending magnesium oxide and graphite in place of copper. However, the addition amounts of magnesium oxide that is an abrasive material and graphite that is a lubricant are extremely large, and it is difficult to improve the various frictional characteristics in a well balance.

Patent Literature 2 is aimed to complement the high-temperature lubricating properties and proposes a method of improving the friction coefficient and the abrasion resistance during high-speed high-load braking by not only containing 1 to 15 mass % of ferrous sulfide in place of copper but also containing 0.3 to 5 mass % of flaky graphite having an average particle diameter of 1 to 100 μm. However, according to this method, it is difficult to improve the stability of the friction coefficient during light-load braking.

SUMMARY OF THE INVENTION

Then, an object of the present invention is to provide a frictional material composition providing a frictional material capable of revealing a friction coefficient which is stable even during light-load braking represented by a regenerative coordination brake through a composition with low environmental hazards and toxicity to the human body, which does not contain copper as an element or has the content of copper of 0.5 mass % or less; a frictional material; and a friction member using the frictional material.

The present inventors have paid attention to the cashew dust and the titanate and found that by controlling the amount of the cashew dust as well as the kind and amount of the titanate to appropriate ranges, respectively, an appropriate amount of the TF can be formed even by light-load braking. In addition, the present inventors have also found that by jointly using a specified abrasive material in a specified amount, it is possible to provide a frictional material capable of revealing a stable friction coefficient. Specifically, the present invention is concerned with the following [1] to [11].

[1] A frictional material composition not containing copper as an element or having the content of copper of 0.5 mass % or less, the composition containing
   a cashew dust;
   (A) potassium titanate;
   (B) one or more selected from the group consisting of lithium potassium titanate and magnesium potassium titanate; and
   (C) one or more selected from the group consisting of zirconium silicate, zirconium oxide, and magnesium oxide, wherein
   the content of the cashew dust is from 1 to 10 mass %, and
   the content of the component (C) is from 11 to 30 mass %.

[2] The frictional material composition as set forth in the above [1], wherein a total content of the component (A) and the component [B] is from 10 to 35 mass %.

[3] The frictional material composition as set forth in the above [1] or [2], wherein a content ratio of the component (A) and the component (B) [(A)/(B)] is from 0.1 to 10 in terms of a mass ratio.

[4] The frictional material composition as set forth in any of the above [1] to [3], further containing, as a metal powder or a metal fiber, one or more selected from the group consisting of iron, tin, zinc, and aluminum in an amount of 0.5 to 5 mass %.

[5] The frictional material composition as set forth in any of the above [1] to [4], further containing a binder in an amount of 5 to 20 mass %.

[6] A frictional material not containing copper as an element or having the content of copper of 0.5 mass % or less, the frictional material containing
   a cashew dust;
   (A) potassium titanate;
   (B) one or more selected from the group consisting of lithium potassium titanate and magnesium potassium titanate; and
   (C) one or more selected from the group consisting of zirconium silicate, zirconium oxide, and magnesium oxide, wherein
   the content of the cashew dust is from 1 to 10 mass %, and
   the content of the component (C) is from 11 to 30 mass %.

[7] The frictional material as set forth in the above [6], wherein a total content of the component (A) and the component [B] is from 10 to 35 mass %.

[8] The frictional material as set forth in the above [6] or [7], wherein a content ratio of the component (A) and the component (B) [(A)/(B)] is from 0.1 to 10 in terms of a mass ratio.

[9] The frictional material as set forth in any of the above [6] to [8], further containing, as a metal powder or a metal fiber, one or more selected from the group consisting of iron, tin, zinc, and aluminum in an amount of 0.5 to 5 mass %.

[10] The frictional material as set forth in any of the above [6] to [9], further containing a binder in an amount of 5 to 20 mass %.

[11] A friction member including the frictional material as set forth in any of the above [6] to [10] and a backing plate integrated therewith.

In accordance with the present invention, it is possible to provide a frictional material composition providing a frictional material capable of revealing a friction coefficient which is stable even during light-load braking represented by a regenerative coordination brake through a composition with low environmental hazards and toxicity to the human body, which does not contain copper as an element or has the content of copper of 0.5 mass % or less; a frictional material; and a friction member using the frictional material.

DETAILED DESCRIPTION OF THE INVENTION

The frictional material composition, the frictional material, and the friction member according to the present embodiments are hereunder described in detail, but it should be construed that the present invention is not limited to the following embodiments.

The frictional material composition and the frictional material according to the present embodiments do not contain asbestos and are so-called non-asbestos frictional material composition and non-asbestos frictional material, respectively.

[Frictional Material Composition]

The frictional material composition according to the present embodiment is a frictional material composition not containing copper as an element or having the content of copper of 0.5 mass % or less, the composition containing
   a cashew dust;
   (A) potassium titanate;
   (B) one or more selected from the group consisting of lithium potassium titanate and magnesium potassium titanate; and
   (C) one or more selected from the group consisting of zirconium silicate, zirconium oxide, and magnesium oxide, wherein
   the content of the cashew dust is 1 to 10 mass %, and
   the content of the component (C) is 11 to 30 mass %.

The frictional material composition according to the present embodiment does not contain copper as an element or has the content of copper of 0.5 mass % or less. Therefore, copper is not contained in an abrasion powder produced during braking, or the content of copper in the abrasion powder is an infinitesimal amount, and hence, there is no concern about pollution of rivers, lakes, and so on. From the viewpoint of suppressing the environmental hazards and toxicity to the human body, the content of copper in the frictional material composition is preferably less than 0.5 mass %, more preferably 0.3 mass % or less, and still more preferably 0.1 mass % or less, and it is especially preferred that copper is not contained.

<Constituent Components of Frictional Material Composition>

Preferably, the frictional material composition according to the present embodiment contains one or more selected from the group consisting of an organic filler, an inorganic filler, a fiber base material, and a binder.

The respective components which the frictional material composition according to the present embodiment contains are hereunder described.

<Organic Filler>

The organic filler is contained as a friction modifier to improve the sound vibration performance, the abrasion resistance, the stability of the friction coefficient during light-load braking, and the like of the frictional material.

Examples of the organic filler include a cashew dust and a rubber component.

The organic filler may be used alone, or may be used in combination of two or more thereof.

(Cashew Dust)

The frictional material composition according to the present embodiment contains, as the organic filler, a cashew dust in an amount of 1 to 10 mass %.

Since the cashew dust is decomposed at low temperatures, it becomes a liquid decomposition product even during light-load braking, thereby making it possible to form an appropriate TF on the disc rotor surface.

As the cashew dust, for example, any cashew dust which is obtained by grinding a cashew nut shell oil having been polymerized and cured and which is typically used for a frictional material may be used.

The median diameter (D50) of cashew dust is preferably 1 to 800 μm, and more preferably 10 to 500 μm, still more preferably 50 to 400 μm.

The content of the cashew dust in the frictional material composition is 1 to 10 mass %, preferably 2 to 8 mass %, and more preferably 3 to 7 mass %. When the content of the cashew dust falls within the aforementioned range, not only the deterioration of the sound vibration performance, such as squeal which is caused due to an increase of elastic modulus of the frictional material, can be suppressed, but also the deterioration of the heat resistance and a lowering of the strength to be caused due to heat hysteresis can be suppressed. Furthermore, the stability of the friction coefficient during light-load braking can be enhanced.

(Other Organic Filler)

The frictional material composition according to the present embodiment may contain, in addition to the cashew dust, other organic filler.

As the other organic filler, a rubber component is preferred. Examples of the rubber component include tire rubber, acrylic rubber, isoprene rubber, NBR (nitrile-butadiene rubber), and SBR (styrene-butadiene rubber). Of those, NBR and tire rubber are preferred, and a combined use of NBR and tire rubber is more preferred.

In the case where the frictional material composition contains the rubber component, the content thereof is preferably 0.2 to 10 mass %, more preferably 0.5 to 5 mass %, and still more preferably 1 to 3 mass %.

In the frictional material composition according to the present embodiment, a combined use of the cashew dust and the rubber component is preferred from the viewpoint of obtaining a stable friction coefficient even by light-load braking.

In the case where the frictional material composition contains the cashew dust and the rubber component, a total content thereof is preferably 2 to 20 mass %, more preferably 3 to 12 mass %, and still more preferably 4 to 10 mass % from the viewpoint of enhancing the stability of the friction coefficient during light-load braking.

In the case where the cashew dust and the rubber component are used in combination, the cashew dust coated with the rubber component may be used, and from the viewpoint of sound vibration performance, the cashew dust and the rubber component may be separately blended.

A total content of the organic filler in the frictional material composition is preferably 2 to 20 mass %, more preferably 3 to 12 mass %, and still more preferably 4 to 10 mass %. When the total content of the organic filler falls within the aforementioned range, the deterioration of the sound vibration performance, such as squeal which is caused due to an increase of elastic modulus of the frictional material, can be suppressed, and the deterioration of the heat resistance and a lowering of the strength to be caused due to heat hysteresis can be suppressed.

<Inorganic Filler>

The inorganic filler is contained as the friction modifier to be used for the purpose of revealing a stable friction coefficient even by light-load braking and the purpose of avoiding the deterioration of the heat resistance of the friction material.

The inorganic filler may be used alone, or may be used in combination of two or more thereof.

The friction material composition according to the present embodiment contains (A) potassium titanate (hereinafter also referred to as "component (A)") and (B) one or more selected from the group consisting of lithium potassium titanate and magnesium potassium titanate (hereinafter also referred to as "component (B)"), and (C) one or more selected from the group consisting of zirconium silicate, zirconium oxide, and magnesium oxide (hereinafter also referred to as "component (C)").

(Component (A) and Component (B))

The component (A) and the component (B) spread onto the friction interface due to braking, thereby contributing to formation of a favorable TF. On the other hand, in the case where the frictional material composition contains the component (A) only without containing the component (B), the deterioration of the abrasion resistance occasionally becomes problematic, whereas in the case where the frictional material composition contains the component (B) only without containing the component (A), an extreme lowering of the friction coefficient occasionally becomes problematic.

A total content of the component (A) and the component (B) in the frictional material composition is preferably 10 to 35 mass %, more preferably 13 to 30 mass %, and most preferably 15 to 25 mass %. When the aforementioned total content is 10 mass % or more, the stability of the friction coefficient is improved, whereas when it is 35 mass % or less, an extreme increase of porosity is suppressed, and a lowering of the mechanical strength of the frictional strength, a lowering of the stability of the friction coefficient to be caused due to moisture absorption, and adherence between the frictional material and the opposite material to be caused due to a rust can be suppressed.

A content ratio of the component (A) and the component (B) in the frictional material composition [(A)/(B)] is preferably 0.1 to 10, more preferably 0.5 to 2, and still more preferably 0.8 to 1.2 in terms of a mass ratio from the viewpoint of the stability of the friction coefficient during light-load braking.

Examples of the component (A) include potassium octatitanate and potassium hexatitanate.

A median diameter (D50) of the component (A) is preferably 1 to 30 μm, more preferably 2 to 20 μm, and still more preferably 3 to 15 μm.

The component (B) is one or more selected from the group consisting of lithium potassium titanate and magnesium potassium titanate. The component (B) may be an embodiment containing lithium potassium titanate only and not containing magnesium potassium titanate, or may be an embodiment containing magnesium potassium titanate only and not containing lithium potassium titanate according to a desired performance.

A median diameter (D50) of the component (B) is preferably 1 to 50 μm, more preferably 5 to 45 μm, and still more preferably 8 to 40 μm.

The component (A) and the component (B) are not restricted with respect to the particle size, the shape, and the like so long as the characteristic are not extremely deteriorated, and for example, the shape may be acicular, platy, granular, amoebic, or the like.

<Component (C)>

The component (C) is one or more selected from the group consisting of zirconium silicate, zirconium oxide, and magnesium oxide and acts as an abrasive material.

The content of the component (C) in the frictional material composition is 11 to 30 mass %, preferably 11 to 25 mass %, and more preferably 11 to 22 mass %. When the aforementioned content is 11 mass % or more, the aggression to the disc rotor that is an opposite material is appropriately imparted, a polishing groove during manufacture remaining on the brake rotor surface when it is new is polished, whereby a surface on which the TF is more readily fixed can be formed. Meanwhile, when the content of the component (C) is 30 mass % or less, the abrasion of the disc rotor can be suppressed without making the aggression to the disc rotor excessive.

In the case where one selected from the group consisting of zirconium silicate, zirconium oxide, and magnesium oxide is contained as the component (C), an embodiment in which the remaining two are not contained may be adopted, and in the case where two selected from the group consisting of zirconium silicate, zirconium oxide, and magnesium oxide are contained as the component (C), an embodiment in which the remaining one is not contained may also be adopted.

A median diameter (D50) of the component (C) is preferably 0.5 to 30 μm, more preferably 0.5 to 20 μm, and still more preferably 0.5 to 15 μm. When the median diameter (D50) of the component (C) is 0.5 μm or more, favorable friction coefficient and aggression to the disc rotor are revealed, whereas when it is 30 μm or less, not only the dispersibility on the friction interface can be enhanced, and the friction coefficient can be made stable, but also the matter that the aggression to the opposite material becomes extremely high can be avoided.

The median diameter (D50) of zirconium silicate is preferably 0.5 to 5 μm, and more preferably 0.6 to 2 μm.

The median diameter (D50) of zirconium oxide is preferably 2 to 15 μm, and more preferably 5 to 10 μm.

The median diameter (D50) of magnesium oxide is preferably 1 to 50 μm, and more preferably 3 to 20 μm.

The median diameter (D50) of the component (C) can be measured by adopting a method, such as laser diffraction particle size distribution measurement. For example, the measurement can be performed with a laser diffraction/scattering type particle size distribution analyzer (trade name: LA•920 (manufactured by Horiba, Ltd.)).

(Other Inorganic Filler)

The frictional material composition according to the present embodiment may contain an inorganic filler other than the aforementioned respective components within a range where the effects of the present embodiment are not impaired.

Examples of the other inorganic filler include tin sulfide, molybdenum disulfide, iron sulfide, bismuth sulfide, zinc sulfide, calcium hydroxide, calcium oxide, sodium carbonate, calcium carbonate, magnesium carbonate, barium sulfate, dolomite, coke, graphite, mica, iron oxide, vermiculite, calcium sulfate, talc, clay, zeolite, mullite, chromite, titanium oxide, activated alumina, such as γ-alumina, and silica. Of those, one or more selected from the group consisting of graphite, tin sulfide, mica, calcium hydroxide, and barium sulfate are preferred.

In the case where the frictional material composition contains graphite, the content thereof is, for example, 0.5 to 10 parts by mass, and preferably 1 to 3 parts by mass.

In the case where the frictional material composition contains tin sulfide, the content thereof is, for example, 0.5 to 10 parts by mass, and preferably 1 to 3 parts by mass.

In the case where the frictional material composition contains calcium hydroxide, the content thereof is, for example, 0.5 to 10 parts by mass, and preferably 1 to 3 parts by mass.

In the case where the frictional material composition contains barium sulfate, the content thereof is, for example, 1 to 60 parts by mass, and preferably 5 to 50 parts by mass.

In the case where the frictional material composition contains other inorganic filler, the total content is preferably 5 to 70 mass %, more preferably 10 to 65 mass %, and still more preferably 15 to 60 mass %.

A total content of the inorganic filler in the frictional material composition is preferably 20 to 80 mass %, more preferably 30 to 80 mass %, and still more preferably 40 to 80 mass % from the viewpoint of providing a frictional material which is excellent in heat resistance and reveals a stable friction coefficient even by light-load braking.

<Fiber Base Material>

Preferably, the frictional material composition according to the present embodiment further contains a fiber base material. The fiber base material exhibits a reinforcing action or the like in the frictional material.

Examples of the fiber base material include an organic fiber, an inorganic fiber, and a metal fiber.

The fiber base material may be used alone, or may be used in combination of two or more thereof.

Examples of the organic fiber include an aramid fiber, an acrylic fiber, a cellulose fiber, and a phenol resin fiber. Of those, an aramid fiber is preferred from the viewpoints of heat resistance and reinforcing effect.

In the case where the frictional material composition according to the present embodiment contains an organic fiber, the content thereof is 0.5 to 10 mass %, more preferably 1 to 5 mass %, and still more preferably 2 to 4 mass %.

Examples of the inorganic fiber include wollastonite, a ceramic fiber, a biodegradable ceramic fiber, a mineral fiber, a carbon fiber, a glass fiber, a potassium titanate fiber, and an aluminosilicate fiber. However, it is preferred that an inhalant potassium titanate fiber or the like is not contained from the viewpoint of toxicity to the human body.

In this specification, it should be construed that the metal fiber is not included in the definition of the inorganic fiber.

The aforementioned mineral fiber is an artificial inorganic fiber in which blast furnace slag for slag wool, basalt for basalt fiber, and other natural stone are melt-spun as the main component. The mineral fiber is preferably a natural mineral containing an Al element. Specifically, there is exemplified one containing one or more of $SiO_2$, $Al_2O_3$, CaO, MgO, FeO, $Na_2O$, and the like. Of those, a mineral fiber containing an Al element is preferred.

An average fiber length of the mineral fiber is preferably 500 μm or less, and more preferably 100 to 400 μm. When the average fiber length is the aforementioned upper limit value or less, the bond strength with each of the components in the frictional material composition tends to become favorable. The average fiber length as referred to herein refers to a number average fiber length indicating an average value of the lengths of the corresponding fibers. For example, the average fiber length of 200 μm indicates that when 50 mineral fibers to be used as the raw material of the frictional material composition are randomly selected and then measured for the fiber length with an optical microscope, an average value thereof is 200 μm.

In the case where the frictional material composition according to the present embodiment contains an inorganic fiber, the content thereof is preferably 0.5 to 10 mass %, more preferably 1 to 5 mass %, and still more preferably 2 to 4 mass %.

Examples of the metal fiber include an iron-based fiber, a titanium fiber, a zinc fiber, and an aluminum fiber.

In the case where the frictional material composition according to the present embodiment contains a metal fiber, the content thereof is preferably 0.5 to 5 mass %, more preferably 0.6 to 2 mass %, and still more preferably 0.7 to 1 mass %.

The frictional material composition according to the present embodiment may also be one not containing a metal fiber according to a desired performance.

In the case where the frictional material composition according to the present embodiment contains a fiber base material, the total content is preferably 4 to 40 mass %, more preferably 5 to 20 mass %, and still more preferably 6 to 10 mass %. When the total content of the fiber base material falls within the aforementioned range, it is possible to impart an appropriate reinforcing effect to the frictional material without giving a harmful influence, such as a remarkable lowering of efficacy characteristics.

<Binder>

Preferably, the frictional material composition according to the present embodiment contains a binder. The binder has an action of integrating the organic filler, the fiber base material, and the like contained in the frictional material composition with each other, thereby imparting a strength.

The binder may be used alone, or may be used in combination of two or more thereof.

As the binder, a thermosetting resin which is typically used for a frictional material composition can be used.

Examples of the thermosetting resin include a phenol resin; and a variety of modified phenol resins, such as an acrylic rubber-modified phenol resin, a silicone rubber-modified phenol resin, a cashew-modified phenol resin, an epoxy-modified phenol resin, and an alkylbenzene-modified phenol resin. Of those, a phenol resin, an acrylic rubber-modified phenol resin, a silicone rubber-modified phenol resin, and an alkylbenzene-modified phenol resin are preferred from the viewpoint of providing favorable heat resistance, moldability, and friction coefficient.

The content of the binder in the frictional material composition is preferably 5 to 20 mass %, more preferably 7 to 15 mass %, and still more preferably 8 to 12 mass %. When the content of the binder falls within the aforementioned range, not only an excellent strength can be imparted to the frictional material, but also the porosity of the frictional material is reduced, whereby the deterioration of the sound vibration performance, such as squeal which is caused due to an increase of elastic modulus, can be suppressed.

<Metal Powder>

The frictional material composition according to the present embodiment may contain a metal powder.

Examples of the metal powder include an iron powder, a tin powder, a zinc powder, an aluminum powder, and an alloy powder thereof. The metal powder may be used alone, or may be used in combination of two or more thereof.

In the case where the frictional material composition according to the present embodiment contains a metal powder, the content thereof is preferably 0.5 to 5 mass %, more preferably 0.5 to 3 mass %, and still more preferably 1 to 2 mass %. When the content of the metal powder is 0.5 mass % or more, the metal powder not only forms a TF on the disc rotor surface but also polishes or buries a polishing groove of the disc rotor when it is new, whereby the disc rotor surface on which a TF made of the organic filler, the titanate, the metal powder, and the like is readily fixed is produced, and the friction coefficient during light-load braking becomes stable. In addition, when the content of the metal powder is 5 mass % or less, excessive intermetallic adhesion or the like is suppressed, whereby extreme abrasion and deterioration of the frictional material and the disc rotor can be avoided.

The metal powder is not restricted with respect to the particle size, the shape, and the like so long as the characteristic are not extremely deteriorated. The shape may be a spherical shape produced by a general atomizing method or the like, or a columnar shape produced by a general cutting method or the like. In addition, though the purity as the metal is preferably 90% or more, the metal powder surface may be changed to a metal oxide or the like due to long-term storage of the metal powder and the frictional material, or the like.

The frictional material composition according to the present embodiment may also be one not containing a metal powder according to a desired performance.

Preferably, the frictional material composition according to the present embodiment contains, as the metal powder or the metal fiber, one or more selected from the group consisting of iron, tin, zinc, and aluminum.

In the case where the frictional material composition according to the present embodiment contains one or more selected from the group consisting of iron, tin, zinc, and aluminum, the content thereof is preferably 0.5 to 5 mass %, more preferably 0.6 to 4 mass %, and still more preferably 0.7 to 3.5 mass %.

<Other Component>

The frictional material composition according to the present embodiment may contain other component than the aforementioned respective components, as the need arises.

<Frictional Material Produced by Molding the Frictional Material Composition According to the Present Embodiment>

The present invention also provides a frictional material produced by molding the frictional material composition according to the present embodiment.

The frictional material produced by molding the frictional material composition according to the present embodiment can be, for example, produced by a method of hot-press molding a pre-molded product obtained by pre-molding the frictional material composition according to the present embodiment, or a method of directly hot-press molding the frictional material composition according to the present embodiment and if desired, further performing a heat treatment to thermally cure the binder. A specific production method is described in the production method of the frictional material according to the present embodiment as mentioned later and in the section of Examples.

[Frictional Material and Friction Member]

The frictional material according to the present embodiment is a frictional material not containing copper as an element or having the content of copper of 0.5 mass % or less, the composition containing a cashew dust;

(A) potassium titanate;

(B) one or more selected from the group consisting of lithium potassium titanate and magnesium potassium titanate; and (C) one or more selected from the group consisting of zirconium silicate, zirconium oxide, and magnesium oxide, wherein the content of the cashew dust is 1 to 10 mass %, and the content of the component (C) is 11 to 30 mass %.

The kind and content of each of the components to be contained in the frictional material according to the present invention are those the same as described for the aforementioned frictional material composition according to the present embodiment, and preferred embodiments thereof are all the same, too.

<Production Method of Frictional Material>

The frictional material according to the present embodiment can be produced by a generally adopted method by using the frictional material composition according to the present embodiment. Specifically, the frictional material according to the present embodiment can be, for example, produced by uniformly mixing the frictional material composition according to the present embodiment by using a mixer, such as a Loedige (registered trademark) mixer, a pressure kneader, and an Eirich (registered trademark) mixer; pre-molding this mixture using a molding mold; molding the obtained pre-molded product under a condition at a molding temperature of 130 to 160° C. and a molding pressure of 20 to 50 MPa for a molding time of 2 to 10 minutes; and subjecting the obtained molded product to a heat treatment at 150 to 250° C. for 2 to 10 hours. The resultant may be further subjected to coating, a scorching treatment, a polishing treatment, etc., as the need arises.

<Application of Frictional Material>

The frictional material according to the present embodiment is used for the following embodiments (1) to (3).

(1) A configuration of a frictional material only (2) A configuration including a backing plate and a frictional material formed on the backing plate, the frictional material being the frictional material according to the present embodiment serving as a frictional surface.

(3) A configuration further including, in the configuration of the above (2), a primer layer for the purpose of surface modification for enhancing a bonding effect of the backing plate between the backing plate and the friction member; and a bonding layer for the purpose of bonding between the backing plate and the friction member.

Of those, it is preferred to use the frictional material as a friction member including the frictional material according to the present embodiment having the backing plate integrated therewith, as in the above (2) or (3).

The aforementioned backing plate is used for the purpose of improving the mechanical strength of the friction member, and examples of a material thereof include metals, such as iron and stainless steel; and fiber-reinforced plastics, such as an inorganic fiber-reinforced plastic and a carbon fiber-reinforced plastic.

As the aforementioned primer layer and bonding layer, any materials may be used as long as typically used for a friction member, such as a brake shoe.

The frictional material according to the present embodiment is suitable as a frictional material for a disc brake pad and a brake lining of an automobile, etc. In addition, the frictional material according to the present embodiment can be used as a frictional material for a clutch facing, an electromagnetic brake, a retaining brake, etc., by subjecting the friction material to processes, such as molding, processing, and bonding to obtain desired shapes.

Furthermore, the frictional material according to the present embodiment is useful as an "over layer" of the friction member, such as a disc brake pad and a brake lining, because it is excellent in stability of the friction coefficient, abrasion resistance at high temperatures, etc. The frictional material can also be used upon being formed as an "under layer" of the friction member. The "over layer" is the frictional material serving as a frictional surface of the friction member. The "under layer" is a layer placed between the frictional material serving as a frictional surface of the friction member and the backing plate for the purpose of improving the shear strength and the anti-crack properties in the vicinity of the bonding part between the frictional material and the backing plate.

EXAMPLES

The frictional material composition and the frictional material according to the present embodiments are hereunder described in more detail by reference to Examples, but it should be construed that the present invention is by no means limited thereto.

Examples 1 to 7 and Comparative Examples 1 to 7

[Production of Disc Brake Pad]

Respective materials were blended according to blending amounts shown in Table 1, to obtain frictional material compositions of Examples 1 to 7 and Comparative Examples 1 to 6.

Next, each of the frictional material compositions was mixed using a Loedige mixer (manufactured by MATSUBO Corporation, a product name: Loedige mixer M20). This mixture was pre-molded with a molding press (manufactured by OJIKIKAI CO., LTD). Subsequently, the obtained pre-molded product was hot press-molded together with a backing plate (made of iron) (manufactured by Hitachi Automotive Systems, Ltd.) using a molding press (SANKI SEIKO CO., LTD.) under a condition at a molding temperature of 145° C. and a molding pressure of 35 MPa for a molding time of 5 minutes. Subsequently, the obtained molded article was heated at 200° C. for 4.5 hours, polished with a rotary polisher, and then subjected to a scorching treatment at 500° C., to obtain a disc brake pad (frictional material thickness: 9.5 mm, frictional material projected area: 52 cm$^2$).

Various materials used in the Examples and Comparative Examples are as follows.

[Binder]

Resin A (phenol resin): "HP491UP", manufactured by Hitachi Chemical Co., Ltd.

Resin B (phenol resin): "PR1950W", manufactured by Hitachi Chemical Co., Ltd.

[Organic Filler]

Cashew dust: "FF-1051", manufactured by Tohoku Chemical Industries, Ltd.

Rubber component A (tire rubber powder): "Powder TPA", manufactured by CAR QUEST Co., Ltd.

Rubber component B (nitrile butadiene rubber): "Nipol 1411", manufactured by Zeon Corporation

[Inorganic Filler]

Titanate A (potassium octatitanate): "Terracess TF-S", manufactured by Otsuka Chemical Co., Ltd. (shape: flaky, median diameter (D50): 7 μm)

Titanate B (lithium potassium titanate): "Terracess L", manufactured by Otsuka Chemical Co., Ltd. (shape: flaky, median diameter (D50): 25 μm)

Titanate C (magnesium potassium titanate): "Terracess PCS", manufactured by Otsuka Chemical Co., Ltd.

Barium sulfate

Graphite

Tin sulfide

Mica

Calcium hydroxide

Abrasive material A (zirconium silicate): "MZ1000B", manufactured by DAIICHI KIGENSO KAGAKU KOGYO CO., LTD. (median diameter (D50): 1.6 μm)

Abrasive material B (zirconium oxide): "BR-QZ", manufactured by DAIICHI KIGENSO KAGAKU KOGYO CO., LTD. (median diameter (D50): 6.5 μm)

Abrasive material C (magnesium oxide): Magnesium Oxide 2000 for industrial use, manufactured by Kyowa Chemical Industry Co., Ltd.

[Fiber Base Material]

Aramid fiber (organic fiber)

Mineral fiber (inorganic fiber)

Copper fiber

Iron fiber: #0, manufactured by GMT

[Metal Powder]

Zinc powder: "Zn-At-200", manufactured by Fukuda Metal Foil & Powder Co., Ltd. (average particle diameter: 25 to 38 μm)

Tin powder: "AT-Sn No. 200", manufactured by Yamaishi Metal Co., Ltd. (median diameter (D50): 23 μm)

Aluminum powder: "VA-40", manufactured by Yamaishi Metal Co., Ltd.

With respect to the disc brake pad obtained in each of the Examples, the evaluation of various performances was performed using a brake dynamo tester (manufactured by Shin Nippon Tokki Co., Ltd.). In the experiment, the evaluation was performed in terms of an inertia moment of a half of Skyline V35, manufactured by Nissan Motor Co., Ltd. by using a Colette type caliper of general pin-slide type and a ventilated disc rotor (FC250) (gray cast iron), manufactured by Kiriu Corp.

[Evaluation of Friction Coefficient (Efficacy Characteristics) at the 100th Time of Light-Load Braking]

The braking at a vehicle speed of 40 km/h and 0.1 G was repeated 100 times at a disc rotor temperature of 50° C. at the starting time of braking, thereby measuring a friction coefficient at the 100th time of braking. In general, since the surface of a new frictional material has not been subjected to a running-in operation yet, the contact area with the disc rotator is small, and furthermore, the TF is not formed, so that the friction coefficient is low. When the braking is repeated, the friction coefficient increases and becomes stable. However, in the light-load braking at the aforementioned vehicle speed and deceleration and low disc rotor temperature, the friction coefficient becomes hardly stable. The friction coefficient was evaluated according to the following evaluation criteria. The results are shown in Table 1.

(Evaluation Criteria)

A: 0.37 or more and less than 0.43

B: 0.34 or more and less than 0.37, or 0.43 or more and less than 0.47

C: Less than 0.34, or 0.47 or more

[Evaluation of Abrasion Resistance at 400° C.]

An abrasion loss of each of the disc pads at a brake temperature prior to braking of 400° C. and 1000th time of braking was measured in conformity with JASO C427 and evaluated according to the following evaluation criteria. The results are shown in Table 1.

(Evaluation Criteria)

A: Less than 0.60 mm

B: 0.60 mm or more and less than 1.00 mm

C: 1.00 mm or more

TABLE 1

| | | | | Example | | | | | | |
|---|---|---|---|---|---|---|---|---|---|---|
| | | Item | | 1 | 2 | 3 | 4 | 5 | 6 | 7 |
| Blending amount (mass %) | Binder | | Resin A | 10 | 10 | 10 | 10 | 0 | 0 | 0 |
| | | | Resin B | 0 | 0 | 0 | 0 | 10 | 10 | 10 |
| | Organic filler | | Cashew dust | 4 | 5 | 5 | 6 | 5 | 5 | 9 |
| | | | Rubber component A | 1 | 2 | 2 | 2 | 2 | 0 | 0 |
| | | | Rubber component B | 0 | 0 | 0 | 0 | 0 | 2 | 3 |
| | Inorganic filler | Component (A) | Titanate A | 5 | 10 | 10 | 15 | 5 | 10 | 15 |
| | | Component (B) | Titanate B | 5 | 10 | 0 | 15 | 5 | 10 | 15 |
| | | | Titanate C | 0 | 0 | 10 | 0 | 0 | 0 | 0 |
| | | Component (C) | Abrasive material A | 0 | 0 | 0 | 0 | 3 | 3 | 0 |
| | | | Abrasive material B | 12 | 12 | 0 | 30 | 15 | 25 | 15 |
| | | | Abrasive material C | 0 | 0 | 12 | 0 | 0 | 0 | 0 |
| | | | Graphite | 2 | 2 | 2 | 2 | 2 | 2 | 2 |
| | | | Tin sulfide | 2 | 2 | 2 | 2 | 2 | 2 | 2 |
| | | | Mica | 2 | 2 | 2 | 2 | 2 | 2 | 2 |
| | | | Calcium hydroxide | 2 | 2 | 2 | 2 | 2 | 2 | 2 |
| | | | Barium sulfate | 49 | 36 | 36 | 7 | 40 | 19 | 16 |

TABLE 1-continued

| | | | | | | | | |
|---|---|---|---|---|---|---|---|---|
| Fiber base material | Aramid fiber | 3 | 3 | 3 | 3 | 3 | 3 | 3 |
| | Mineral fiber | 3 | 3 | 3 | 3 | 3 | 3 | 3 |
| | Copper fiber | 0 | 0 | 0 | 0 | 0 | 0 | 0 |
| | Iron fiber | 0 | 1 | 0 | 0 | 0 | 1 | 2 |
| Metal powder | Zinc powder | 0 | 0 | 1 | 0 | 0 | 1 | 1 |
| | Tin powder | 0 | 0 | 0 | 1 | 0 | 0 | 0 |
| | Aluminum powder | 0 | 0 | 0 | 0 | 1 | 0 | 0 |
| Evaluation results | Friction coefficient at the 100th time of light-load braking | A (0.37) | A (0.38) | A (0.37) | A (0.39) | A (0.40) | A (0.41) | A (0.38) |
| | Abrasion resistance at 400° C. | B (0.65) | A (0.51) | A (0.49) | B (0.85) | B (0.91) | A (0.57) | B (0.71) |

| | | | | Comparative Example | | | | | |
|---|---|---|---|---|---|---|---|---|---|
| | | Item | 1 | 2 | 3 | 4 | 5 | 6 | 7 |
| Blending amount (mass %) | Binder | Resin A | 6 | 10 | 10 | 10 | 10 | 0 | 8 |
| | | Resin B | 0 | 0 | 0 | 0 | 0 | 12 | 0 |
| | Organic filler | Cashew dust | 0.5 | 5 | 5 | 5 | 5 | 12 | 3 |
| | | Rubber component A | 0 | 2 | 2 | 2 | 2 | 2 | 1 |
| | | Rubber component B | 0 | 0 | 0 | 0 | 0 | 2 | 0 |
| | Inorganic filler | Component (A) Titanate A | 10 | 10 | 20 | 0 | 10 | 10 | 15 |
| | | Component (B) Titanate B | 10 | 10 | 0 | 20 | 10 | 10 | 0 |
| | | Titanate C | 0 | 0 | 0 | 0 | 0 | 0 | 0 |
| | | Component (C) Abrasive material A | 0 | 9 | 0 | 0 | 0 | 3 | 0 |
| | | Abrasive material B | 12 | 20 | 12 | 30 | 5 | 20 | 15 |
| | | Abrasive material C | 0 | 20 | 0 | 0 | 0 | 0 | 0 |
| | | Graphite | 2 | 2 | 2 | 2 | 2 | 2 | 2 |
| | | Tin sulfide | 2 | 2 | 2 | 2 | 2 | 2 | 2 |
| | | Mica | 2 | 2 | 2 | 2 | 2 | 2 | 2 |
| | | Calcium hydroxide | 2 | 2 | 2 | 2 | 2 | 2 | 2 |
| | | Barium sulfate | 47.5 | 0 | 37 | 19 | 44 | 13 | 34 |
| | Fiber base material | Aramid fiber | 3 | 3 | 3 | 3 | 3 | 3 | 3 |
| | | Mineral fiber | 3 | 3 | 3 | 3 | 3 | 3 | 3 |
| | | Copper fiber | 0 | 0 | 0 | 0 | 0 | 0 | 10 |
| | | Iron fiber | 0 | 0 | 0 | 0 | 0 | 1 | 0 |
| | Metal powder | Zinc powder | 0 | 0 | 0 | 0 | 0 | 1 | 0 |
| | | Tin powder | 0 | 0 | 0 | 0 | 0 | 0 | 0 |
| | | Aluminum powder | 0 | 0 | 0 | 0 | 0 | 0 | 0 |
| Evaluation results | Friction coefficient at the 100th time of light-load braking | | C (0.31) | B (0.45) | A (0.44) | C (0.33) | C (0.32) | B (0.36) | A (0.40) |
| | Abrasion resistance at 400° C. | | B (0.62) | C (1.11) | C (1.05) | A (0.58) | A (0.55) | C (1.10) | A (0.55) |

Examples 1 to 7 exhibited the friction coefficient and abrasion resistance on the same levels with Comparative Example 7 containing copper. That is, it is noted that the frictional material composition according to the present embodiment is a composition with low environmental hazards and toxicity to the human body, which does not contain copper as an element or has the content of copper of 0.5 mass % or less, and it is able to reveal a stable friction coefficient even during light-load braking. In addition, Comparative Example 1 in which the content of the cashew dust is extremely small, Comparative Examples 2 containing an extremely large amount of the abrasive material, Comparative Example 3 containing potassium titanate only as the titanate, Comparative Example 4 containing lithium potassium titanate only as the titanate, Comparative Example 5 in which the content of the abrasive material is extremely small, and Comparative Example 6 in which the content of the cashew dust is extremely large were inferior with respect to any of at least the friction coefficient or the abrasion resistance.

INDUSTRIAL APPLICABILITY

As compared with conventional products, in accordance with the frictional material composition of the present invention, even if not using copper with a high environmental load, an appropriate amount of TF is formed even during light-load braking, thereby revealing a stable friction coefficient. Thus, the frictional material composition of the present invention is suitable for a frictional material and a friction member, such as a braking pad, etc. for not only general passenger cars but also passenger cars mounted with a regenerative coordination brake.

The invention claimed is:

1. A frictional material composition not containing copper as an element or having the content of copper of 0.5 mass % or less, the composition comprising:
   a cashew dust in an amount of 4 to 9 mass %;
   a rubber component in an amount of 1 to 3 mass %;
   (A) potassium titanate in an amount of 5 mass % or more;
   (B) one or more selected from the group consisting of lithium potassium titanate and magnesium potassium titanate in an amount of 5 mass % or more;
   (C) one or more selected from the group consisting of zirconium silicate, zirconium oxide, and magnesium oxide in an amount of 12 to 30 mass %;
   one or more selected from the group consisting of iron, tin, zinc, and aluminum in an amount of 0 to 3 mass % as a metal powder or a metal fiber; and
   barium sulfate in an amount of 7 to 49 mass %;
   wherein a total content of the component (A) and the component (B) is 10 to 30 mass %.

2. The frictional material composition according to claim 1, wherein a content ratio of the component (A) and the component (B) [(A)/(B)] is from 0.1 to 10 in terms of a mass ratio.

3. The frictional material composition according to claim 1, wherein the one or more selected from the group consisting of iron, tin, zinc and aluminum is present in an amount of 0.5 to 3 mass %.

4. The frictional material composition according to claim 1, further comprising a binder in an amount of 5 to 20 mass %.

5. A frictional material not containing copper as an element or having the content of copper of 0.5 mass % or less, the frictional material comprising:
- a cashew dust in an amount of 4 to 9 mass %;
- a rubber component in an amount of 1 to 3 mass %,
- (A) potassium titanate in an amount of 5 mass % or more;
- (B) one or more selected from the group consisting of lithium potassium titanate and magnesium potassium titanate in an amount of 5 mass % or more;
- (C) one or more selected from the group consisting of zirconium silicate, zirconium oxide, and magnesium oxide in an amount of 12 to 30 mass %,
- one or more selected from the group consisting of iron, tin, zinc, and aluminum in an amount of 0 to 3 mass % as a metal powder or a metal fiber;
- barium sulfate in an amount of 7 to 49 mass %;
- wherein a total content of the component (A) and the component (B) is 10 to 30 mass %, and
- wherein the frictional material is produced by molding a friction material composition.

6. The frictional material according to claim 5, wherein a content ratio of the component (A) and the component (B) [(A)/(B)] is from 0.1 to 10 in terms of a mass ratio.

7. The frictional material according to claim 5, wherein the one or more selected from the group consisting of iron, tin, zinc, and aluminum is present in an amount of 0.5 to 3 mass %.

8. The frictional material according to claim 5, further comprising a binder in an amount of 5 to 20 mass %.

9. A friction member comprising the frictional material according to claim 5 and a backing plate integrated therewith.

* * * * *